United States Patent [19]
Barr et al.

[11] Patent Number: 5,313,197
[45] Date of Patent: May 17, 1994

[54] SELF-DIAGNOSTIC PAGING SYSTEM

[75] Inventors: William M. Barr, Lake Worth; Steven J. Goldberg, Coral Springs, both of Fla.

[73] Assignee: Motorola, Inc., Schaumburg, Ill.

[21] Appl. No.: 766,371

[22] Filed: Sep. 27, 1991

[51] Int. Cl.[5] .............................................. H04Q 1/00
[52] U.S. Cl. ............................. 340/825.44; 340/825.16
[58] Field of Search ................... 340/825.44, 825.07, 340/825.16, 311.1; 455/67.1, 67.4, 38.1, 38.2, 69; 371/20.1, 20.4, 20.5, 32, 33, 34; 379/56. 57

[56] References Cited

U.S. PATENT DOCUMENTS

| | | | |
|---|---|---|---|
| 4,599,615 | 7/1986 | Umetsu | 340/825.44 |
| 4,649,538 | 3/1987 | DeLuca et al. | 340/825.44 |
| 4,825,193 | 4/1989 | Siwiak et al. | 340/311.1 |
| 4,940,963 | 7/1990 | Gutman et al. | 340/825.44 |
| 4,977,399 | 12/1990 | Price et al. | 340/825.44 |
| 5,014,344 | 5/1991 | Goldberg | 340/825.44 |
| 5,027,427 | 6/1991 | Shimizu | 455/67.4 |
| 5,040,181 | 8/1991 | Roux | 455/67.1 |

Primary Examiner—Donald J. Yusko
Assistant Examiner—Edwin C. Holloway, III
Attorney, Agent, or Firm—R. Louis Breeden; Thomas G. Berry; Daniel R. Collopy

[57] ABSTRACT

A paging system (100) includes a transmitter (104) for transmitting first information including a transmitted page, a receiver (108) for receiving second information, and a diagnostic controller (106) coupled to the transmitter (104) and the receiver (108) for monitoring the first and second information to determine whether the transmitted page was correctly received by the receiver (108).

27 Claims, 11 Drawing Sheets

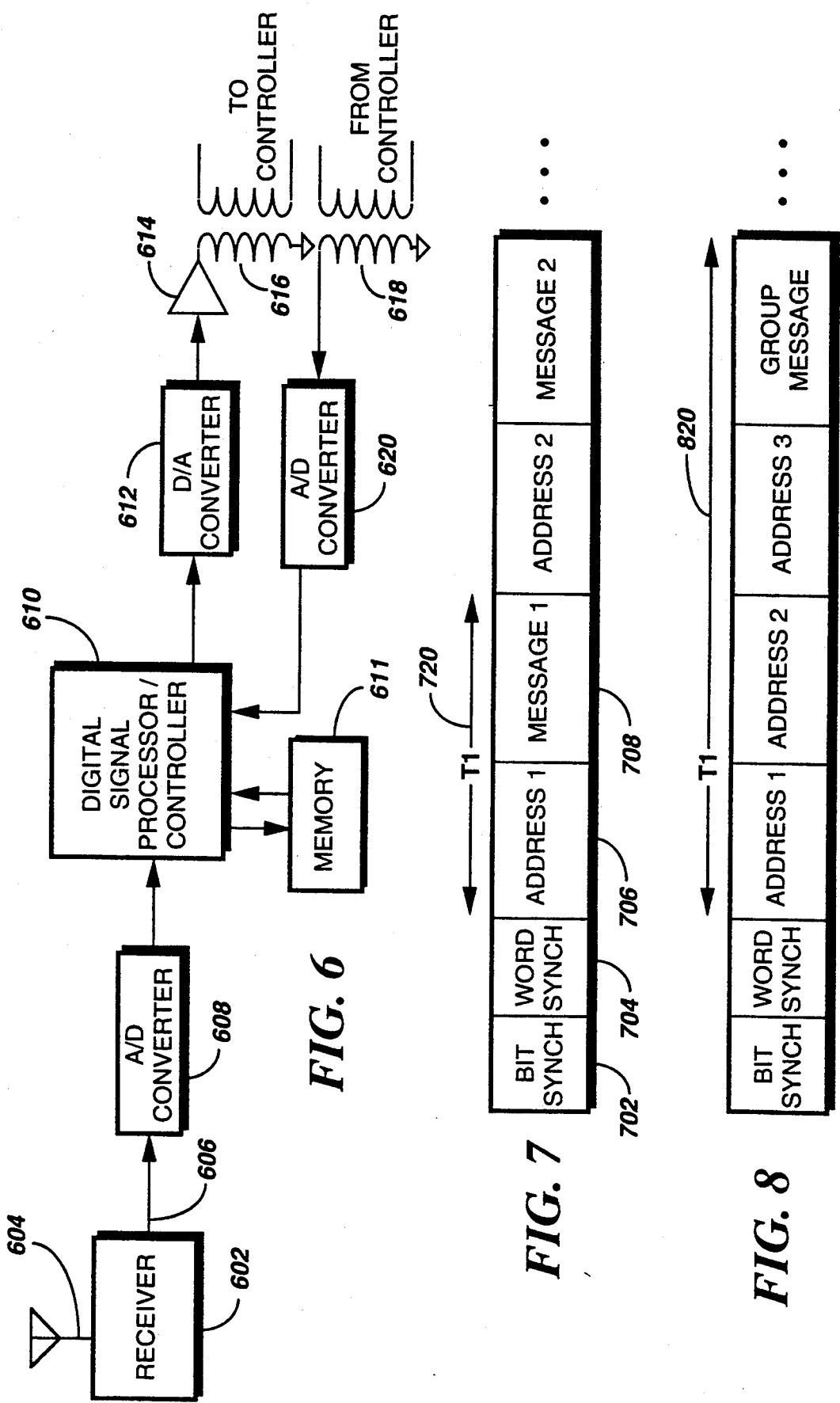

SELF-DIAGNOSTIC PAGING SYSTEM

FIELD OF THE INVENTION

This invention relates in general to the field of paging systems, and more specifically to paging systems capable of monitoring system performance.

BACKGROUND OF THE INVENTION

A major concern for modern paging systems is the ever increasing customer demand for continuous, efficient, and reliable paging service. Customers typically expect their pages to be forwarded efficiently (minimal amount of delay) and reliably (no missed pages) over a paging coverage area that may sometimes span a wide geographic area.

To meet the aforementioned customer demands, and also due to the increasing structural and logistic complexities of modern paging systems, the amount of time and effort spent in performing system maintenance and diagnosing reported problems has increased significantly. For conventional paging systems, unfortunately, service personnel routinely perform many maintenance items, including diagnosing reported problems such as missed pages, by taking the entire paging system (or major portions thereof) off-line for a time interval. Since this discontinues normal paging service to the paging system's customers, incoming revenues are reduced and customers are temporarily inconvenienced.

Diagnosing paging system problems, i.e., performing paging system diagnostics, normally involves determining why pages are not being received or correctly received by one or more selective call receivers in a predetermined paging coverage area or areas. Further, these paging system diagnostics can involve monitoring specified paging system parameters and determining if tolerances of the paging system parameters are within specified limits, or if specific maintenance actions are needed. Particularly important are those paging system parameters that affect the characteristics of paging transmissions for correct reception of pages. Typically, this diagnostic process comprises a repetitive sequence: measure specified parameter(s), make any necessary adjustment or repair, and measure the parameter(s) again to verify correct operation. In known paging systems, this paging system diagnostic process is normally performed by service technicians with the paging system (or a major portion thereof) being off-line to perform the test or measurement.

For example, one particularly laborious and time consuming procedure involves testing the integrity of the paging system (e.g., was a page accepted by the paging terminal actually transmitted by the paging system and correctly received by a pager?). In one scenario, service personnel test system integrity by sending repeated test pages via the paging system to a reserved test pager, which is typically carried on the person of a service technician. The service technician then travels to many different test locations in the paging coverage area to determine the reliability of reception of the test pages. This procedure can be very time consuming. Making matters worse, this test procedure usually involves taking the conventional paging system (or a major portion thereof) off-line, because under normal on-line operation the varying incoming paging traffic loads combined with variable latencies within the paging system's internal queues can significantly reduce the efficiency of the aforementioned integrity testing procedure. Hence, this time consuming test procedure being performed with the paging system off-line can seriously inconvenience customers during testing. Furthermore, since paging system integrity testing is many times a reactive service procedure (e.g., performed in response to a customer reporting that a page was missed, and sometimes after many customers have complained of missing pages), the time spent diagnosing the problem with the paging system off-line further aggravates customers that are already aggravated by previously missed pages.

In addition, unfortunately, there may not always be a clear and direct correspondence between the successful reception of the test pages by the reserved test pager and the successful reception of the normal on-line pages by customers. Testing the paging system under relatively simplistic off-line conditions rarely replicates the actual paging system conditions during on-line operation. Therefore, testing the integrity of the paging system as described above can significantly inconvenience customers and may not always be effective in diagnosing and quickly solving the missing pages problem.

For efficient and reliable operation, many paging system parameters must also be monitored periodically to maintain the paging system operating within specified limits. These critical paging system parameters, some of which tend to vary over time, can affect the reliable transmission and reception of pages. For example, in a conventional simulcast paging system the synchronization of a plurality of paging transmitters is critical for effective communication to occur. It is necessary that the simulcast page being transmitted from the plurality of paging transmitters arrive at the paging receiver essentially at the same time from all sources. Hence, the relative delays of the different transmission paths taken by the simulcast page must be synchronized, and the synchronization maintained over time, to assure reliable reception of simulcast pages. This test procedure normally involves verifying and adjusting the relative delays of the transmission paths from the paging terminal to the plurality of transmitter basestations. Other exemplary paging system parameters that may be critical for proper system performance include the distortion of the transmitted signal from each transmitter basestation, the effective transmitted power of each paging transmitter, the frequency of the transmitted carrier signal from each paging transmitter, and any other interference or noise signals that may be present with the transmissions.

Many of these types of parametric measurements are performed by service technicians often using esoteric techniques that are applied in less than standard fashion from technician to technician, and usually with little if any assistance from the paging system equipment. This can significantly increase the time necessary for parametric system testing and can also reduce the reliability of diagnostic inference from any results. Further, these measurements are typically performed with the paging system (or a major portion thereof) being off-line, and sometimes in response to customer complaints of missed pages, which additionally frustrates customers.

Therefore, this diagnostic process determines whether a number of paging system parameters are within specified limits, and optionally adjusts the paging system parameters as necessary for maintaining proper operation. Regrettably, in conventional paging systems, the implementation of this diagnostic process can significantly inconvenience customers and may offer marginal reliability in diagnosing the paging system problem.

Due to the extreme competition in today's marketplace, the consequences of not adapting the modern paging system to meet the ever increasing demand for continuous, efficient, and reliable paging service to customers may include loss of potential revenue due to extended periods of system down-time, loss of customer satisfaction, and ultimately loss of competitiveness leading to business failure. Moreover, in a governmental or medical paging system the loss of communication may prove grave and devastating for a community.

Thus what is needed is a more efficient and reliable paging system capable of self-diagnostic monitoring.

SUMMARY OF THE INVENTION

One aspect of the present invention is a paging system, comprising a transmitter for transmitting first information including a transmitted page into a paging channel while maintaining the paging system on-line, the transmitted page being destined for a customer paging receiver. The paging system further comprises a receiver other than the customer paging receiver for receiving second information from the paging channel while the transmitter is transmitting the first information into the paging channel, the second information corresponding to the first information comprising the transmitted page. The paging system further comprises a diagnostic element, coupled to the transmitter and the receiver, for monitoring the first and second information to determine whether the transmitted page was correctly received by the receiver while maintaining the paging system on-line.

Another aspect of the present invention is a paging system diagnostic controller for use in a paging system having a paging transmitter and a paging receiver. The paging system diagnostic controller comprises a transmitter monitor coupled to the paging transmitter for monitoring transmitted first information including a transmitted page being transmitted into a paging channel by the paging transmitter while maintaining the paging system on-line, the transmitted page being destined for a customer paging receiver. The paging system diagnostic controller further comprises a receiver monitor coupled to a paging receiver other than the customer paging receiver for monitoring received second information being received by the paging receiver from the paging channel while the paging transmitter is transmitting the first information into the paging channel, the second information corresponding to the first information including the transmitted page. The paging system diagnostic controller further comprises a verification element coupled to the transmitter monitor and the receiver monitor for determining whether the transmitted page was correctly received within the second information received by the paging receiver while maintaining the paging system on-line.

Another aspect of the present invention is a self-diagnostic paging system, comprising a transmitter for transmitting a test signal into a paging coverage area of the self-diagnostic paging system, and a receiver for receiving a diagnostic signal from the paging coverage area while the transmitter is transmitting the test signal into the paging coverage area, the diagnostic signal corresponding to the test signal. The self-diagnostic paging system further comprises a monitor coupled to the transmitter for providing the test signal thereto and coupled to the receiver for monitoring the transmit parameters of the self-diagnostic paging system as determined from the diagnostic signal received by the receiver.

Another aspect of the present invention is a method for diagnosing page reception failures in a paging system, the paging system comprising a transmitter for transmitting first information comprising a transmitted page and a receiver for receiving second information. The method comprises the step of transmitting first information comprising a transmitted page into a paging channel while maintaining the paging system on-line, the transmitted page being destined for a customer paging receiver. The method further comprises the steps of monitoring the first information at the transmitter, and receiving second information at the receiver from the paging channel while transmitting the first information into the paging channel, the receiver being other than the customer paging receiver, the second information corresponding to the first information comprising the transmitted page. The method further comprises the step of determining a page transmission failure has occurred when the transmitted page was monitored having been transmitted with the first information by the transmitter and not having been received with the second information by the receiver while maintaining the paging system on-line.

BRIEF DESCRIPTION OF THE DRAWINGS

FIG. 6 is a block diagram of the receiver of FIG. 1, in accordance with the preferred embodiment of the present invention.

FIG. 7 is a diagram illustrating a paging signal, as may be transmitted over a paging channel.

FIG. 8 is a diagram illustrating a group paging signal, as may be transmitted over a paging channel.

DESCRIPTION OF A PREFERRED EMBODIMENT

Figure 1:
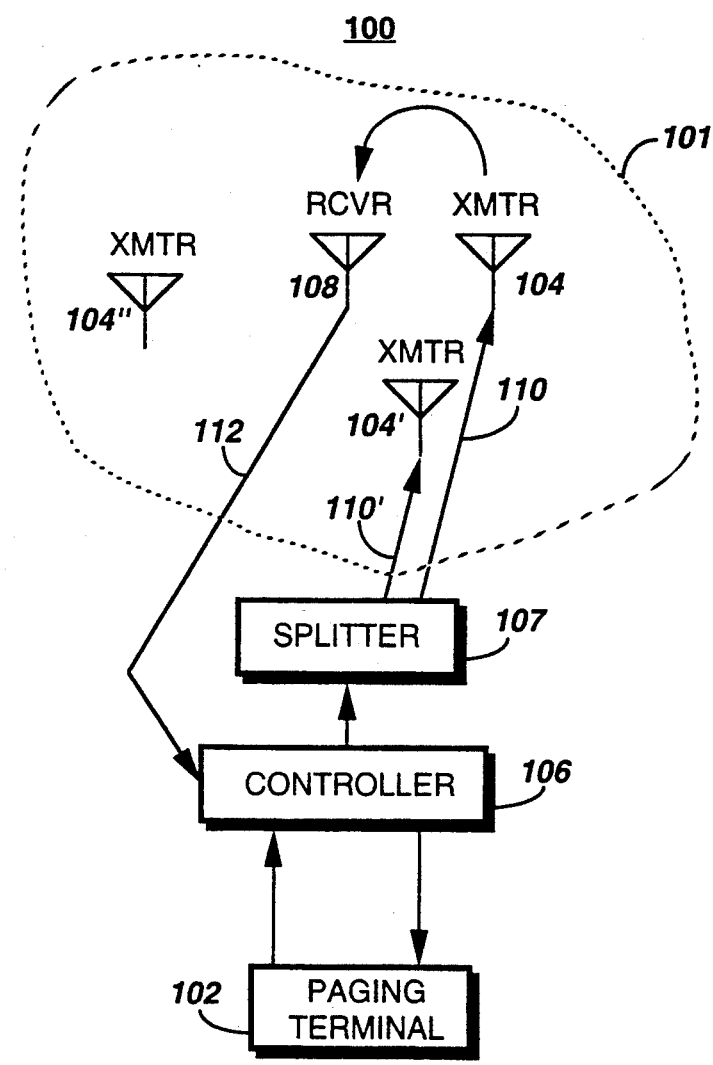
FIG. 1 is a block diagram of a paging system in accordance with the present invention.

According to the present invention, FIG. 1 shows a block diagram of a paging system 100 that is capable of monitoring page transmissions and diagnosing specific paging system problems, as will be discussed below. The paging system 100 may have multiple transmitters, 104, 104', and 104", covering either independent or overlapping paging coverage areas, optionally operating in a simulcast paging fashion, using techniques known to those skilled in the art.

Operationally, a controller 106 routes paging information from the paging terminal 102, and optional control information as necessary, to the plurality of transmitters, 104, 104', and 104", in a known way. Paging information may be routed to the plurality of transmitters, 104, 104', and 104", through different media 110, such as the public switched telephone network (PSTN), radio links, or microwave links. Optionally, a splitter 107 routes the same paging information to more than one transmitter 104, such as may be necessary for simulcast paging transmissions.

One or more receivers 108 (only one of which is shown), are coupled via a link 112 to the corresponding controller 106 to receive information from the paging channel or coverage area 101. The receiver 108 is strategically located in the paging coverage area 101 to receive a transmitted signal from each corresponding transmitter 104. In this way, the receiver 108 may receive a paging signal representative of the transmission from each corresponding transmitter 104 or a combination thereof, 104, 104', and 104", as will be more fully discussed below.

For a simulcast paging system implementation, (i.e., where a plurality of transmitters 104 simultaneously transmit a page), the simulcasting transmitters 104 are typically synchronized by equalizing the relative delays between the different paths 110 to the corresponding transmitters 104. Due to the variability of the delays through the different media of the paths 110 relative to each other and over time, a number of methods have been proposed or are in use today for automatically synchronizing the transmissions from the transmitters 104 utilized in the simulcast transmission system. In one of these methods, a receiver 108 is coupled back to the controller 106 to effect the delay measurements necessary to subsequently adjust the relative delays applied to each of the simulcast transmitters 104. A more complete discussion of this method and apparatus for automatically synchronizing the transmissions in a wide area simulcast transmission system may be found in U.S. Pat. No. 5,014,344 to Steven J. Goldberg, entitled "A Method For Synchronizing The Transmissions in a Simulcast Transmission System", which is assigned to the Assignee of the present invention and which is incorporated herein by reference.

Figure 2:
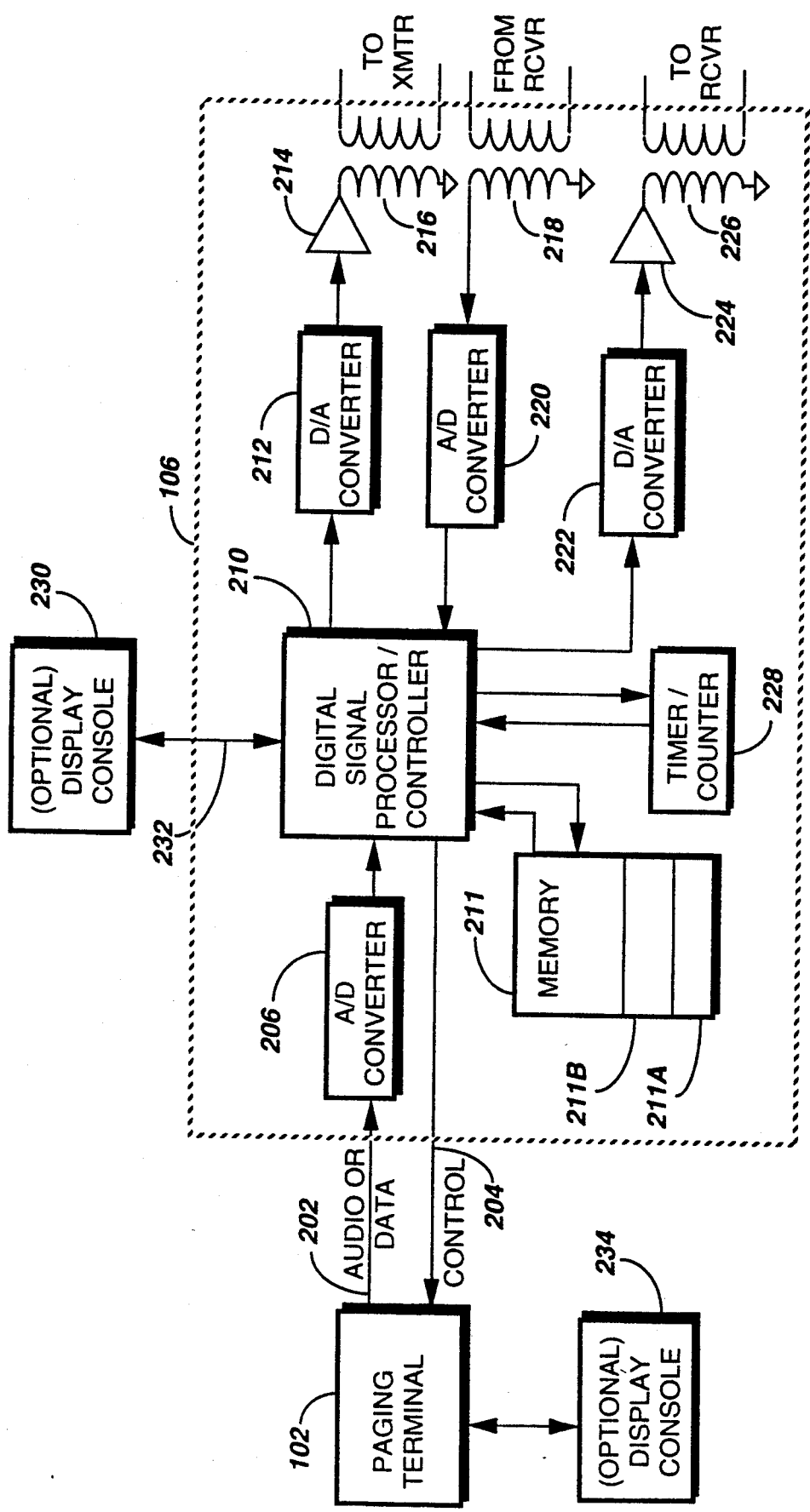
FIG. 2 is an electrical block diagram of a controller for the paging system of FIG. 1, according to the preferred embodiment of the present invention.

Referring to FIG. 2, an electrical block diagram of the controller 106 is shown, according to the preferred embodiment of the present invention. In normal on-line operation, the controller 106 receives audio or data signals via a line 202 from a conventional paging terminal 102 in a manner well known to those skilled in the art. These signals typically constitute one or more pages sequentially transmitted from the paging terminal 102. Each page is normally defined by a destination address coupled to an optional message, i.e., for a tone only page the destination address provides all the necessary page information. Additionally, control signals from the controller 106 provide general status information back to the paging terminal 102 via a line 204, such as may be needed to synchronize the outbound paging traffic.

Preferably, a digital signal processor (DSP) and the controller 210, such as a Motorola DSP 56000 digital signal processor integrated circuit, is used to receive the paging audio or data signal that is first digitally encoded via an analog-to-digital (A/D) converter 206.

Subsequently, the received paging information may be temporarily stored in a first portion of memory 211A, e.g., in a temporary buffer or a queue structure in memory 211, typically until the paging system is ready to transmit the next page. Then, the DSP 210 couples the paging information comprising the page to be transmitted to the input of a digital-to-analog (D/A) converter 212. The output of the D/A converter 212 couples the decoded audio or data signal to the input of amplifier 214, which amplifies the signal for transmission to the transmitter or group of transmitters 104 (FIG. 1). The output of amplifier 214 couples to a line transformer 216, which couples the signal to a communication circuit, such as a telephone line in the PSTN, radio link, or microwave link, as discussed earlier. In this way, the paging information is transmitted by the paging terminal 102 and routed by the controller 106 to the paging transmitters 104.

In similar fashion, an audio or data signal from the receiver 108 (FIG. 1) can be coupled to the DSP 210, via the return path and communication circuit 112 (FIG. 1), the transformer 218, and the A/D converter 220. The return link 112 may also comprise a telephone line (PSTN), a radio link, microwave link, or other suitable media.

The DSP 210 can then store the digitally encoded signal from the receiver 108 in a second portion of memory 211B, e.g., in a temporary receive buffer or a receive queue in memory 211. Hence, by using the paging information available to the controller 106, and which is stored in the first and second portions of memory 211, the DSP 210 is capable of automatically determining that a test page was transmitted and also received by the receiver 108. Further, by optionally enabling a timer or counter 228 to measure a maximum allowable elapsed time from when the test page was transmitted to when the test page was received and confirmed at the controller 106, as will be subsequently more fully discussed.

Lastly, test results and other diagnostic information may be presented to administrative personnel via an optional display console 230, or presented on hardcopy via an optional printer (not shown), or a combination thereof using known communication techniques. Further, the diagnostic information resulting from any tests may be optionally provided to the paging terminal 102 via link 204 similarly using known communication techniques, which may then be conveniently presented to administrative personnel via an optional display console 234 or a printer (not shown). These features for presenting the diagnostic information to administrative/service personnel will be further discussed below.

Figure 3:
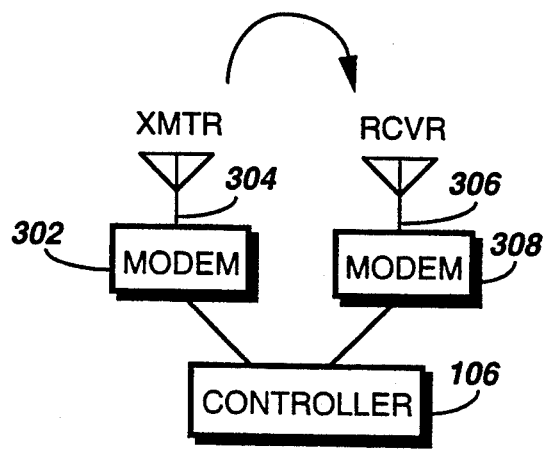
FIGS. 3 and 4 show alternative system configurations.
Figure 4:
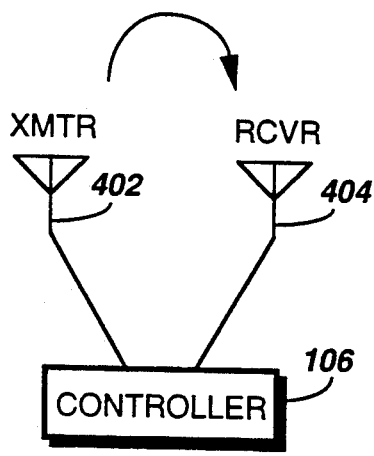
Figure 5:
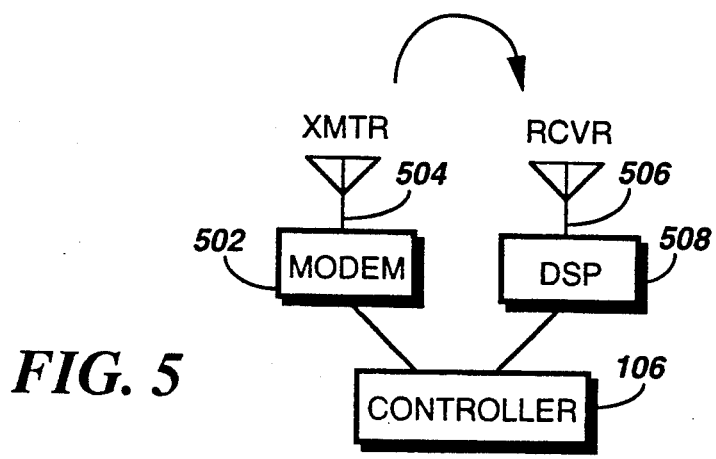
FIG. 5 shows the preferred embodiment system configuration, utilizing the controller of FIG. 2 in accordance with the present invention.

Referring to FIGS. 3, 4, and 5, three different system block diagrams are shown for coupling the controller 106 to the transmitter 104 and the receiver 108, in accordance with three embodiments of the present invention. FIGS. 3 and 4 show alternative system configurations, and FIG. 5 shows the preferred embodiment.

The system configuration of FIG. 3 is more suitable for digital paging systems that can transmit and receive the digital paging signals, and use the controller 106 to verify the validity of the data. Typically, the paging terminal 102 via the controller 106 sends modem tones to the transmitter 304 via modem 302. The transmitter 304 then normally transmits FSK modulation over the paging channel, which is demodulated to a baseband audio or data signal by the receiver 306. Modem 308 then modulates the received baseband audio or data signal in a form (a modem communication signal) that will traverse the path back to the controller 106, using known techniques. Typically, the DSP 210 in the controller 106 is capable of retrieving and digitally encoding the baseband data signal from the modem communication signal sent by modem 308. Optionally, a second modem (not shown) may provide an interface between modem 308 and the controller 106, coupling the baseband data signal to the controller 106.

The system configuration shown in FIG. 4 tends to treat the whole loop 106, 402, 404, and back to 106 as a transparent analog path, and is more suitable for tone only and audio paging systems. In operation, the paging terminal 102 through the controller 106 sends audio signals that are directly modulated and transmitted by transmitter 402. The receiver 404 demodulates the received signal to baseband audio which is routed back to the controller 106. One advantage of this configuration in analyzing system parameters that are important for transmission of pages is that the DSP 210 in the controller 106 is capable of analyzing the quality of the entire transmission path, including the links 110 and 112. In this way, service personnel can measure, for example, the distortion of a test signal, or the presence of interfering signals or other noise signals, while examining the entire transmission path of the test signal, i.e., from the controller 106, to the transmitter 104, over the paging channel, and back to the controller 106 from the receiver 108.

FIG. 5 illustrates the system configuration according to the preferred embodiment of the present invention. Typically, the paging terminal 102 via the controller 106 sends modem communication to the transmitter 504 via modem 502. The transmitter 504 then normally transmits FSK modulation over the paging channel, which is demodulated to a baseband audio or data signal by the receiver 506. Digital signal processor 508 is capable of directly analyzing the demodulated baseband audio or data signal from the receiver 506, and then communicating results back to the controller 106 via a digital link, optionally using modem communication. This system configuration may be suitable for digital and analog paging. Further, the paging channel (e.g., the radio channel), can be analyzed for transmission parameters, as will be more fully discussed below.

Referring to FIG. 6, an electrical block diagram of the receiver 108 (FIG. 1) is shown, in accordance with the preferred embodiment of the present invention. Preferably, an antenna 604 operates with receiver 602 to receive and demodulate a radio frequency signal using known techniques. The demodulated baseband audio or data signal present at the input 606 of an analog-to-digital (A/D) converter 608 is digitally encoded and provided to a digital signal processor (DSP) and controller 610. The information provided with the digitally encoded signal may be temporarily stored in memory 611. The DSP 610 is then capable of analyzing the information provided with the digitally encoded signal, using known digital analysis techniques such as the Fast Fourier Transform (FFT), as will be subsequently more fully discussed. The results of any analysis may be communicated to the controller 106 via digital communication (e.g., modem communication) as provided by the DSP 610, a digital-to-analog (D/A) converter 612, an amplifier 614, coupled through transformer 616, and a communication circuit such as a telephone line, radio link, microwave link, or other suitable transmission media. In this way, received information can be monitored and optionally analyzed at the receiver station 108. Subsequently, a communication may be sent to the controller 106 to make a decision on what action to take, based on the analysis of the received information. Further, the receiver 108 is preferably capable of receiving control and data information from the controller 106 via the communication link 112 (FIG. 1), transformer 618, A/D converter 620, and the DSP 610. In this preferred way, the controller 106 can instruct the receiver 108 as to the next diagnostic test to perform and can receive the results, as will be more fully discussed below.

Therefore, the self diagnostic paging system 100, including the controller 106 shown in FIG. 2 and the receiver 108 shown in FIG. 6, may be capable of automatically transmitting a page, monitoring the page being transmitted, and monitoring the page being received by the receiver 108. Further, a number of transmit parameters characterizing the transmitter 104 and the paging channel can be automatically analyzed. Furthermore, by using modern transmitters 104, such as the PURC 5000 transmitter basestation that is manufactured by Motorola, Incorporated, the controller 106 is capable of automatically adjusting specific transmit parameters at each transmitter 104 by sending commands to the transmitters 104. Typical instructions sent to individual transmitters (or a group thereof) can include: 1) adjust the transmitter output power, 2) adjust the relative frequency offset of the carrier frequency, and 3) adjust the time delay for a transmitted signal through the respective transmitter. The latter adjustment is useful for synchronizing a group of simulcast transmitters 104 in a paging coverage area 101. By automatically monitoring system integrity and system transmit parameters, the self diagnostic paging system 100 can significantly reduce the amount of time spent by service personnel in diagnosing system problems and performing routine parametric system measurements for maintenance purposes. Further, the consistency and repeatability of the automated tests significantly enhances the reliability of the results, which is an important factor in quickly identifying and correcting paging system problems.

In a first aspect of the present invention for performing a system integrity test, the controller 106 has stored in an area of memory 211 a predetermined test page. The controller 106 preferably sends an instruction to the receiver 108 to begin monitoring the received information for the test page, the instruction containing the necessary information to identify the upcoming test page, such as the test page destination address and optional message. At this point, the controller 106 and the receiver 108 are initialized to begin monitoring the transmitted information and the received information for the predetermined test page.

In a second alternative way to initialize the receiver, the receiver 108 may already have a predetermined test page address and optional message stored in memory 611. In this case, either an explicit instruction to begin monitoring for the test page is used, or the receiver's 108 default mode of operation may continuously monitor the paging channel for the predetermined test page, unless instructed otherwise.

In a third alternative way to initialize the receiver 108, the receiver 108 may be instructed to receive, decode, and send back to the controller 106 all pages of a predetermined type. For example, following a conventional paging protocol such as Golay Sequential Code (GSC), the receiver 108 could send back to the controller 106 all digital paging having GSC destination addresses and optional digital messages. Subsequently, the controller 106 can determine if the transmitted test page is part of the received information, e.g., the test page was correctly received, as will be more fully discussed below.

In any case, the controller 106 and the receiver 108 are initialized and ready to monitor for the transmitted test page. The test page can then be transmitted with other paging traffic from the controller 106, through the transmitters 104, and into the paging channel of the paging coverage area, using known techniques.

Once the test page is monitored by the controller 106 as being transmitted, e.g., being routed to the transmitters 104, the controller 106 optionally may enable a timer or counter 228 (FIG. 2) that measures a maximum allowable elapsed time from when the test page was transmitted to when the test page was received and confirmed at the controller 106. Measurement of this time interval can be useful in determining if a transmitted page was not received, which is typically an indication of a system failure in transmission. Specifically, if the test page is not received within a predetermined time interval after being transmitted, it is determined to be not received. It may be appreciated by one skilled in the art that in an on-line paging system the time interval for a transmitted page to be received and confirmed at the controller 106 should typically vary within a maximum range, the variability being due to a number of system constraints and system design issues. Generally, a number of delays must be accounted for while waiting for the confirmation at the controller 106. Some of these delays include the delay from controller 106 to transmitters 104 via path 110, the delay from transmitters 104 to reception by receiver 108, the detection of the received test page by receiver 108, and the delay through path 112 back to the controller 106. These delays may have some variability, which does not necessarily preclude the successful reception of the test page.

Additionally, the ongoing paging traffic may provide further variability to the delay from transmission to ultimate confirmation back to the controller 106. FIGS. 7 and 8 illustrate two different paging scenarios that may be encountered during on-line system integrity testing. FIG. 7 shows a sequence of individual pages, as may be transmitted over a paging channel. Typically, the paging system transmits bit synchronization 702 and word synchronization 704 as part of a preamble just prior to sending out the page, following a conventional paging protocol such as Golay Sequential Code (GSC) or Post Office Code Standardization Advisory Group (POCSAG). These signals 702 and 704 provide additional delay that must be accounted for. Further, the type of page being transmitted can significantly add delay during transmission. For example, test page 1 may have a delay 720 when transmitted as an individual page. Alternatively, as shown in FIG. 8, test page 1 may have delay 820 when transmitted as part of a group page. Hence, as a practical matter, the controller 106 includes the timer or counter 228 to provide a means for tracking the overall delay to determine when a test page was not received within a predetermined time interval.

In the preferred mode, when receiver 108 detects the test page in the received information from the paging channel, the receiver 108 subsequently sends back to the controller 106 a confirmation signal to confirm the correct reception of the complete transmitted page. The confirmation being detected by the controller 106 constitutes a successful loop back integrity test.

Alternatively, the test page may not be correctly received. Either the destination address for the page (and consequently the optional message), or simply the optional message may not have been completely and correctly detected by the receiver 108 in the loop back integrity test. In the former case, the controller 106 typically will use the timer or counter 228 to determine incorrect reception as discussed earlier. In the latter case, where the destination address is correctly detected by the receiver 108 in the received information but the optional message is not completely and correctly detected, i.e., erroneously received or at least partially not received, the test page should be determined to have been incorrectly received and the condition indicated to the controller 106 accordingly. This latter test result can be communicated from the receiver 108 to the controller 106 using known methods and techniques.

In a second aspect of the present invention for performing a system integrity test, as may be appreciated by the skilled artisan, the self diagnostic paging system is capable of utilizing a page being transmitted by the paging terminal 102 to perform the paging system integrity testing. The test page in this case is generally not predetermined. For example, a page being transmitted by the paging terminal 102 comprises a GSC encoded destination address and numeric message. The transmitted page, along with other paging information, is routed to the controller 106 via link 202. Typically, the paging information, including the transmitted page, are represented in an audio or data signal present at the input of the A/D converter 206. The output of the A/D converter 206 provides a digitally encoded representation of the audio or data signal, which is normally forwarded to the appropriate transmitters 104 by the digital signal processor (DSP) 210, the D/A converter 212, the amplifier 214, and the coupling transformer 216. The DSP 210 may select the transmitted page for the system integrity test, and store a representation of the transmitted page, i.e., the "test page", into the first portion of memory 211A. In one approach, the DSP 210 then instructs the receiver 108 to begin receiving and decoding all received information from the paging channel following the conventional GSC paging protocol, and further sending back to the controller 106 all digital paging having GSC destination addresses and optional digital messages. As mentioned before, the instruction from the controller 106 to the receiver 108 may be digitally encoded and routed via the link 112 by using modem communication. Hence, the DSP 210 coupled with the D/A converter 222, the amplifier 224, and the transformer 226 may operate to couple the instruction to the receiver 108, using known communication techniques.

The DSP 610 subsequently decodes any paging information that may be present with the demodulated audio at output 606 of the receiver 602 (FIG. 6), using known page decoding techniques. Specifically, the A/D converter 608 provides a digitally encoded representation of any audio or data signal to the DSP 610. Following known page decoding methods, the DSP 610 extracts paging information from the output of the A/D converter 608, and optionally stores the paging information in memory 611. Then, the paging information may be sent back to the controller 106 using modem communication or other digital communication, as discussed earlier. Therefore, any received, demodulated, and decoded page information can be routed back to controller 106 via the DSP 610, the D/A converter 612, the amplifier 614, the transformer 616, and the link 112.

Subsequently, the controller 106 can determine if the transmitted "test page" is part of the received information. In the preferred mode, the controller 106 stores the paging information being routed back from the receiver 108 into the second portion of memory 211B, where the "transmitted page" was previously stored in the first portion of memory 211A. Then, the controller 106 can compare pages being received as part of the received information to the previously transmitted test page to determine that the "test page", i.e., in this case a GSC numeric page having been transmitted by the paging terminal 102, was completely and correctly received, as discussed earlier.

Therefore, the self-diagnostic paging system 100 can perform automatic system integrity tests while the paging system 100 is on-line. This has the advantage of not inconveniencing customers with any delays in paging due to system down time, i.e., the system is not taken off-line to perform system integrity testing. Further, the system testing can be performed under near normal paging conditions to provide more reliable and representative test results of the paging system when it is on-line. Lastly, the "test pages" being monitored can be the actual pages being transmitted to customers by the paging system. This clearly identifies that pages destined for customers were transmitted into the paging channel, i.e., the paging coverage area 101. These test results can be properly logged for future reference, such as in a data base structure stored in memory 211, or presented to administrative personnel via an optional display console 230, or presented on hardcopy via an optional printer (not shown), or a combination thereof using known techniques.

Further, the diagnostic information resulting from any tests may be optionally provided to the paging terminal 102 via link 204 using known techniques. The diagnostic information can then be conveniently presented to administrative personnel via the optional display console 234 or a printer (not shown).

Additionally, an alarm page may be transmitted by the paging system 100 to paging system administrative personnel, such as the service technicians, in response to a test page being incorrectly received. This representation of the diagnostic information captured during system integrity testing, when timely dispatched, can quickly alert the service technicians of impending system failures before customers complain. Hence, the self-diagnostic paging system 100 is capable of "calling for help", thereby allowing the service technicians to be more mobile in dealing with ongoing system maintenance and other operation issues.

Figure 9A:
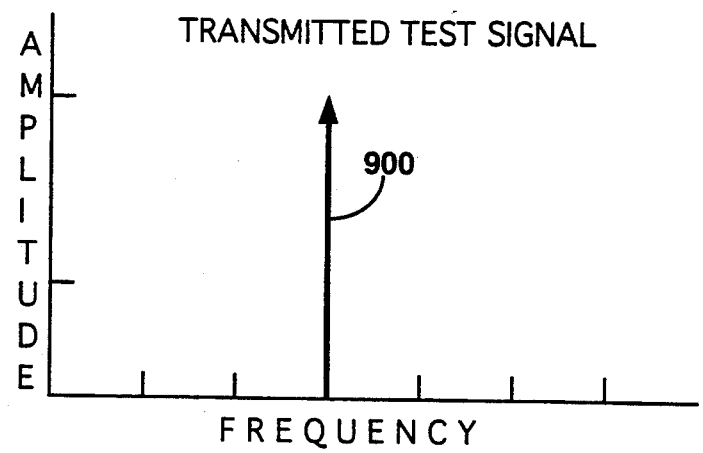
FIG. 9A is a frequency vs. amplitude chart showing an exemplary test signal.
Figure 9B:
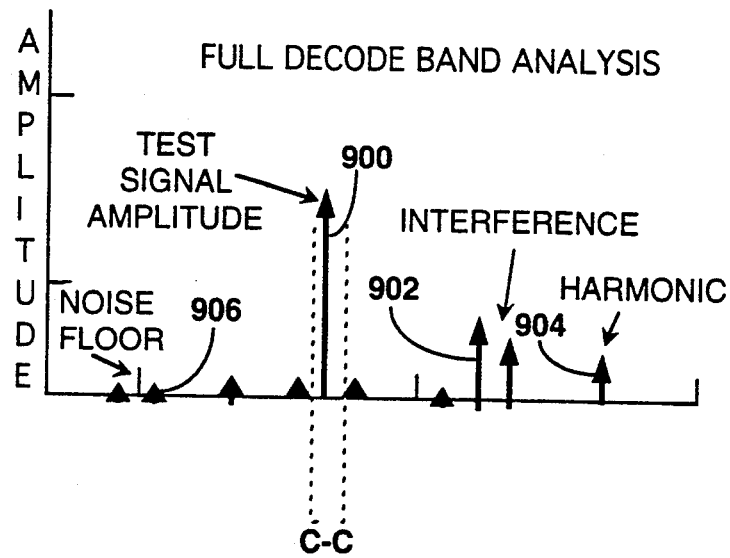
FIG. 9B is a frequency vs. amplitude chart showing a full frequency band of a paging channel.
Figure 9C:
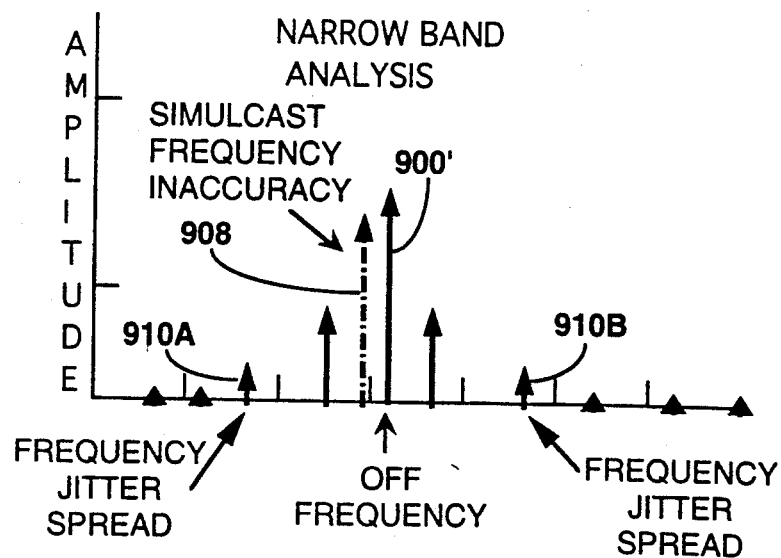
FIG. 9C is a frequency vs. amplitude chart showing a narrow frequency band of the paging channel of FIG. 9B.

Referring to FIGS. 9A, 9B, and 9C, three frequency vs. amplitude charts are shown to illustrate some exemplary transmit parameters that may be important during paging transmissions. These transmit parameters are preferably monitored and analyzed by the receiver 108 of the self diagnostic paging system 100 from the paging channel. Specifically, FIG. 9A shows an exemplary test signal at a carrier frequency 900 that can be received from the paging channel. FIG. 9B shows a frequency band of the typical paging channel frequencies generally about the test signal at the carrier frequency of FIG. 9A. Lastly, FIG. 9C shows a frequency band of paging channel frequencies near the test signal 900', typically in the range of approximately +/−5 KHz from the nominal center carrier frequency, also shown in FIG. 9B as frequency region C-C. These charts further illustrate two modes of monitoring the paging channel for important transmit parameters, as shown for FIGS. 9B and 9C, i.e., full decode band analysis and narrow band analysis, as will be more fully discussed below.

The aforementioned test signal at a carrier frequency 900 (FIGS. 9A and 9B) is typically transmitted by the paging system 100 as a 1 KHz sinusoidal signal modulating a carrier frequency signal, using known techniques. The controller 106 sends out the test signal to one or more transmitters 104 for a particular paging coverage area, in a known way. The corresponding receiver 108 then is instructed by the controller 106 to receive, demodulate, and then to digitally encode the baseband audio or data signals present and to store the encoded information in the memory 611 for subsequent analysis by the DSP 610, e.g., using known FFT techniques. The analysis results are then forwarded to the controller 106 for determination of an action to perform, if any.

Preferably, this parametric monitoring is done with the system being at least partially off-line, and can be done either in response to a test page being incorrectly received and confirmed at the controller 106 (as discussed earlier), or as a normal scheduled maintenance item. The scheduled parametric diagnostics for maintenance purposes may be automatically performed at an opportune time when normal paging traffic would be least impacted, such as at night time or at a particular time in the weekend. This timing preferably is automatically maintained by the controller 106 using timer module 228 and known techniques, hence, assuring that periodic testing of system parameters will be performed on schedule. Similarly, scheduled testing of system integrity as discussed earlier may be scheduled periodically to test the system under specific traffic loads and conditions, such as during peak periods of paging traffic activity as determined by paging logs or other statistics maintained by administrative personnel. In this way, the self-diagnostic paging system 100 can automatically perform the tedious chores of scheduling and performing specific tests to determine the integrity of the paging system or the status of important transmit parameters, as needed. This then releases service personnel from the tedious burden, which provides a significant economic advantage over conventional paging systems.

Specifically, noise or distortion signals such as shown in FIG. 9B may be monitored by the receiver 108 using the full band analysis mode, which scans a wider band of frequencies about the test signal using known techniques. These distortion signals include any interference signals 902, any harmonic distortion 904, and the noise floor 906 which may be present within the full band of frequencies monitored. The relative amplitudes of these offending signals 902, 904, or 906, either individually or collectively, with respect to the test signal amplitude 900 constitute an important transmit parameter, generally categorized as distortion of a transmit signal.

Additionally, as shown in FIG. 9C, the relative carrier frequency position of the received test signal 900' may be off from the specified nominal value, measured using known techniques. Hence, the transmit carrier frequency for the particular transmitter 104 may be determined to be far enough away from the nominal specified value using known techniques to warrant an adjustment of that transmitter's transmit frequency or other maintenance activity.

Two additional phenomena of the distortion of the transmit signal are shown in FIG. 9C. First, in the case of a simulcast transmission, a simulcast frequency inaccuracy 908 may be monitored in the paging channel due to different transmitters 104, 104', and 104" being off from each other in their relative transmit carrier frequencies. Hence, these signals, when sufficiently deviating from the specified center carrier frequency tend to look like interference signals. A second contribution to the general category of distortion signals is frequency jitter 910A and 910B. Again, this type of signal can be monitored using known techniques, and an adjustment or repair of a specific transmitter may be necessary.

Furthermore, the relative transmit power of individual transmitters with respect to each other can be monitored by the receiver 108. The amplitude of the received test signal 900 is indicative of the transmit power of the corresponding transmitter 104, as is well known to those skilled in the art. Hence, the relative transmit power of transmitters 104, as received by the receiver 108, is another important transmit parameter that can be monitored by the self-diagnostic paging system 100.

Lastly, the propagation delay of a delay measurement transmit signal may be measured periodically, as is more fully discussed in U.S. Pat. No. 5,014,344 to Steven J. Goldberg, entitled "A Method For Synchronizing The Transmissions in a Simulcast Transmission System", to synchronize a group of transmitters 104 that typically are servicing a common overlapping paging coverage area. The monitoring of this transmit parameter, i.e., performing this delay measurement, followed by any necessary adjustment of the relative delays through the transmitters 104 is a vital procedure for proper operation of a simulcast paging system. An automatic approach similar to those presented earlier herein is capable of scheduling the propagation delay measurements at appropriate times, and then executing a sequence of relative delay measurements for individual transmitters 104 in a simulcast group. Test results could normally invoke a set of actions by the paging system 100 and associated service personnel, such as logging the measurements by means of information presented on a hardcopy printer output or displayed on a display console 230, 234, or both, or informing service personnel by using the paging system to transmit alert pages having diagnostic information corresponding to the test results, or automatically performing the needed propagation delay adjustments of individual transmitters 104 as needed, or a combination of the above. Hence, the self-diagnostic paging system 100 is capable of periodically and automatically monitoring this propagation delay to synchronize one or more groups of transmitters 104 as discussed above, which is a significant advantage in time and resources required for testing as compared to contemporary paging system implementations.

Therefore, in the preferred mode of operation, the controller 106 is capable of instructing the receiver 108 to monitor the paging channel for specific transmit parameters and subsequently to respond with test results, preferably with the paging system (or a portion thereof) being temporarily placed off-line to perform the test. The controller 106 then takes any necessary action based on the test results, such as informing administrative/service personnel, making automatic adjustments of transmitter basestations, logging diagnostic results, or taking other actions that may be required by service technicians.

Figure 10A:
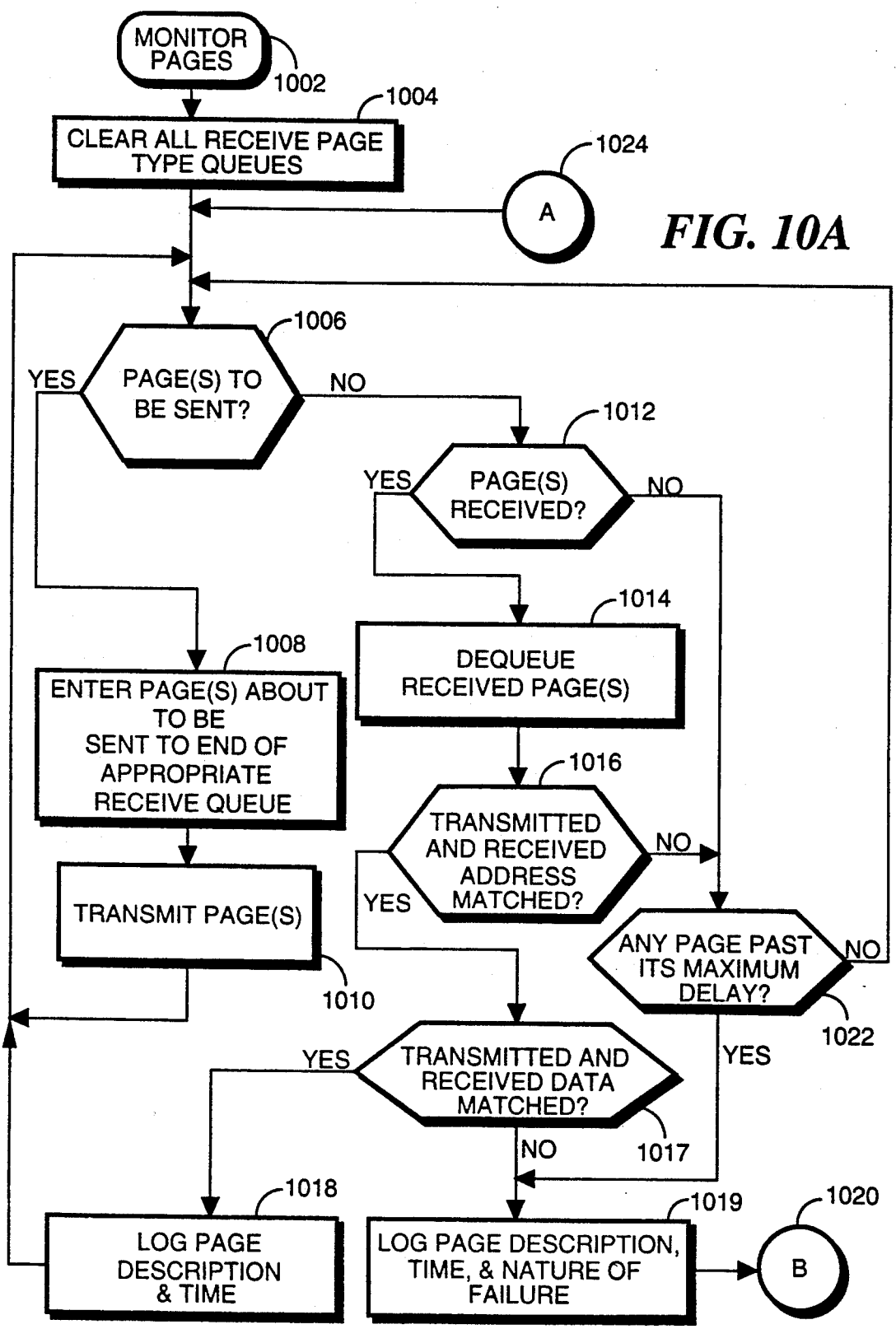
FIGS. 10A, 10B, 10C, and 10D comprise a flow diagram for the controller of FIG. 2, in accordance with the preferred embodiment of the present invention.
Figure 10B:
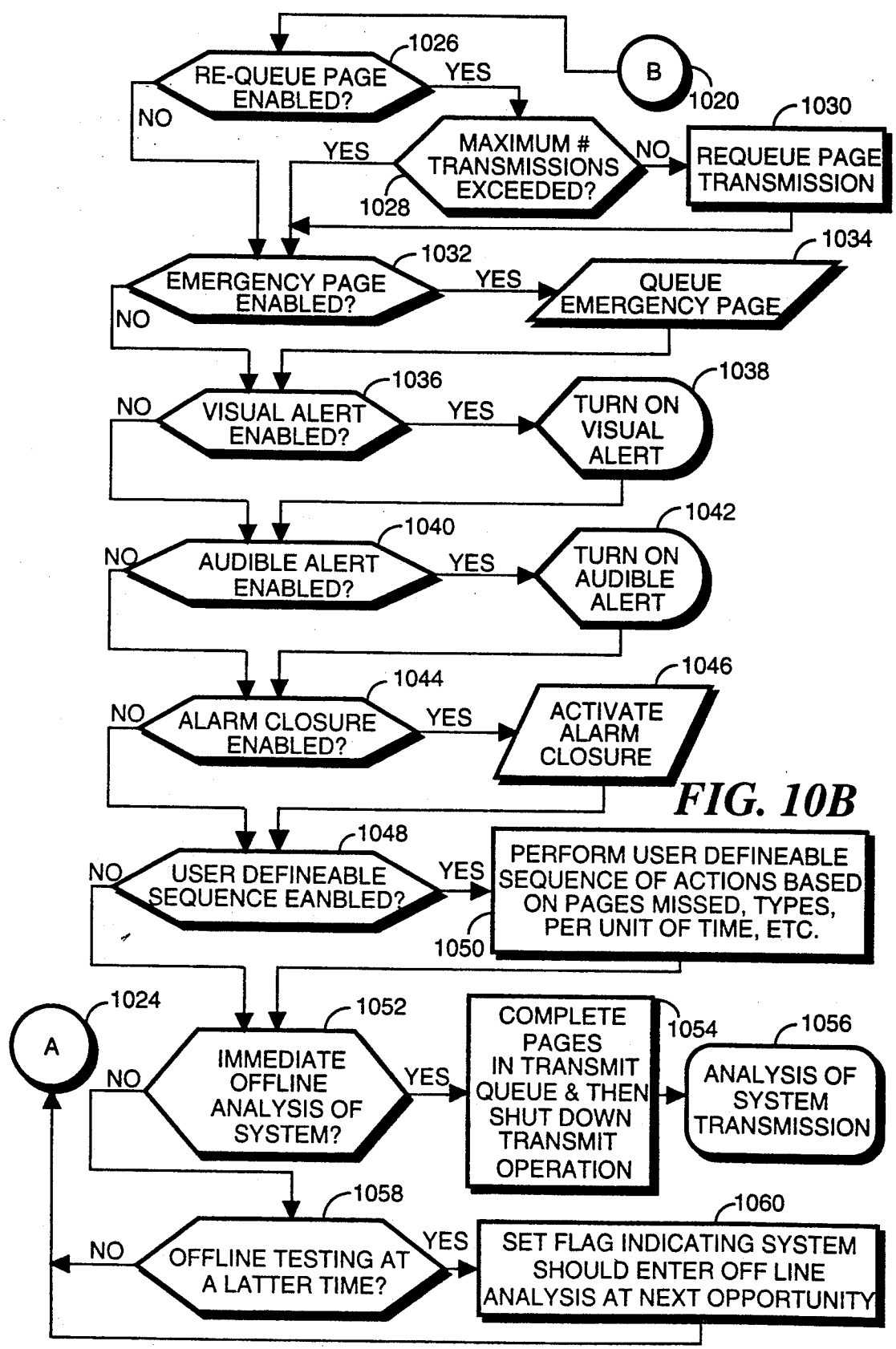
Figure 10C:
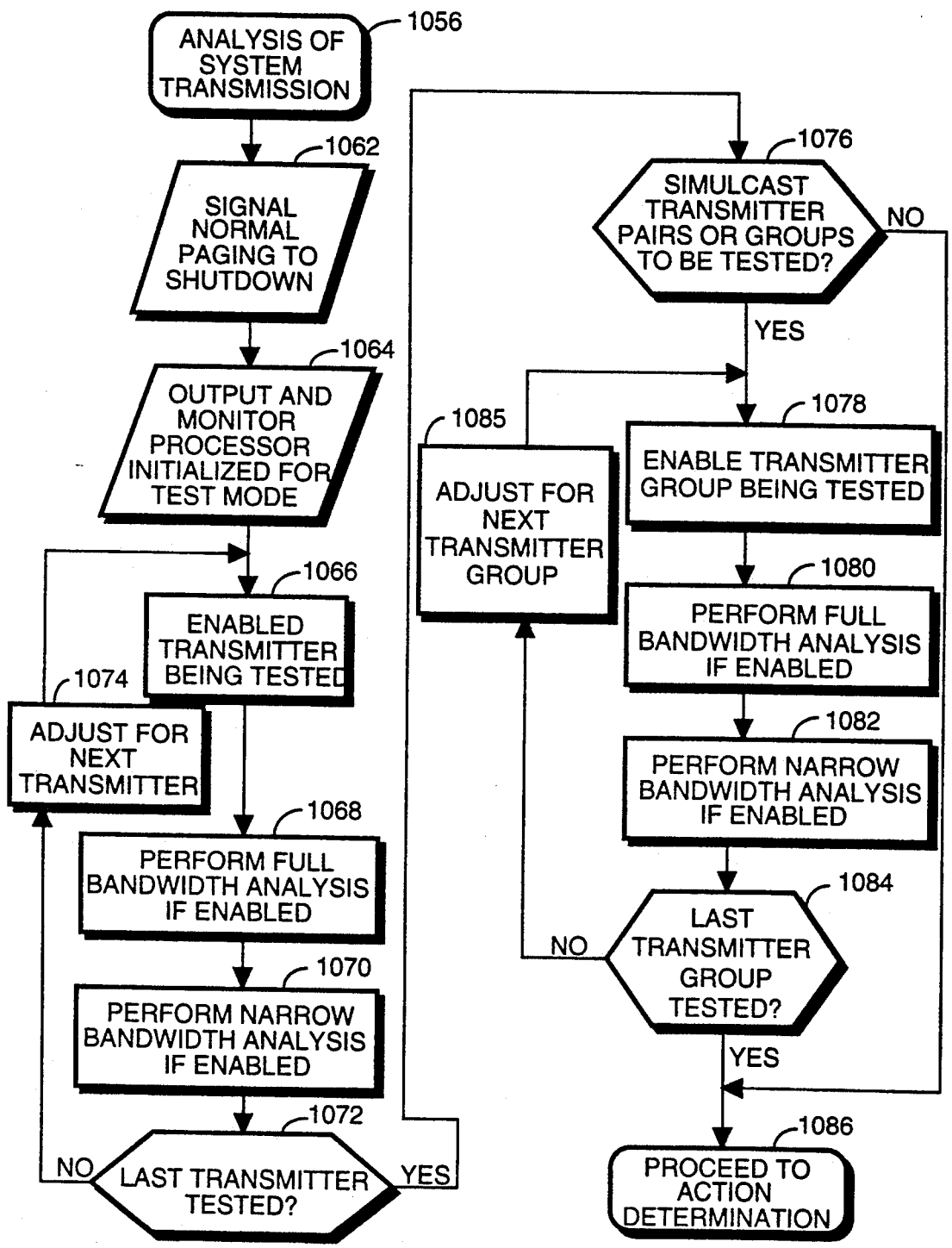
Figure 10D:
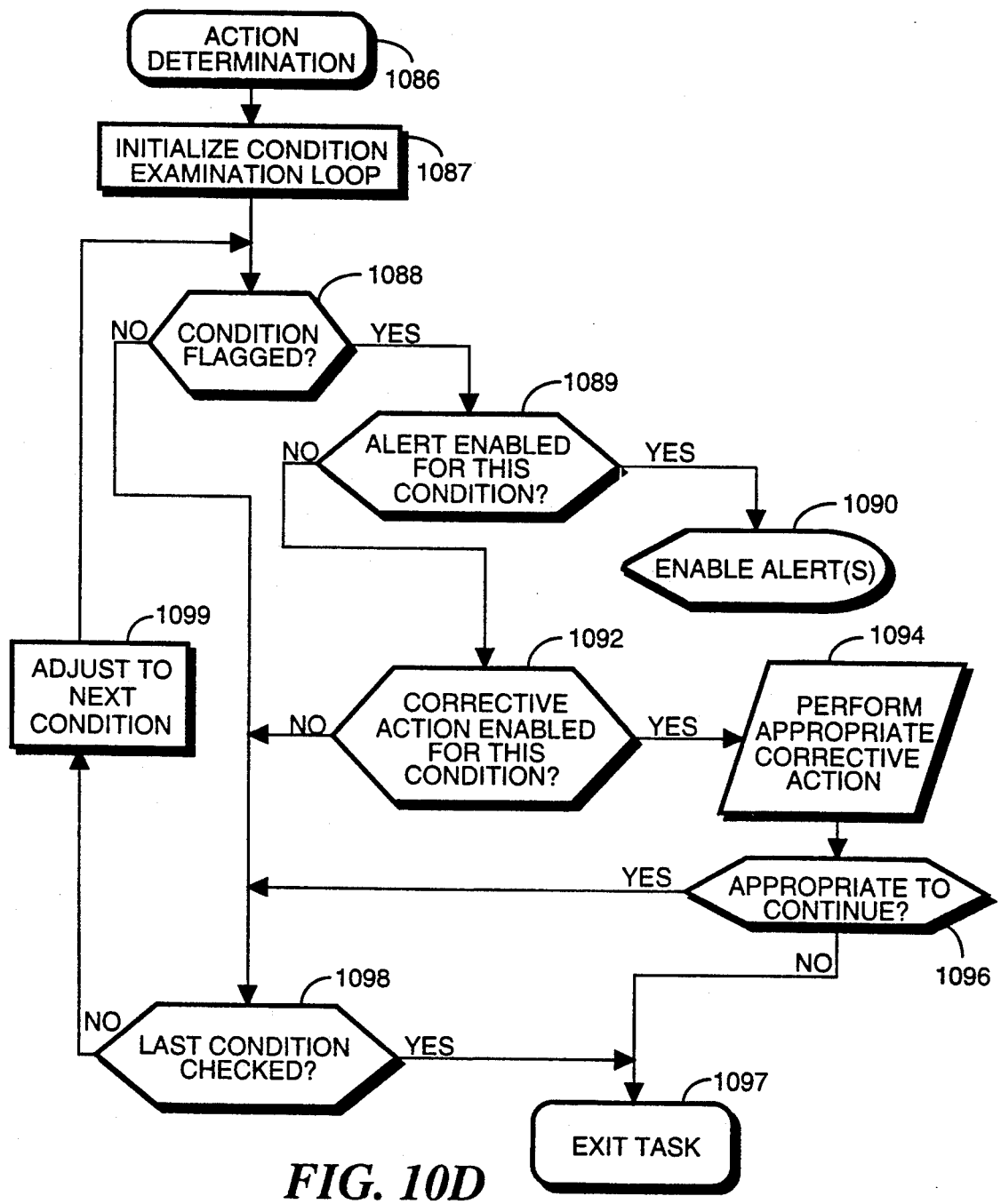
Figure 11A:
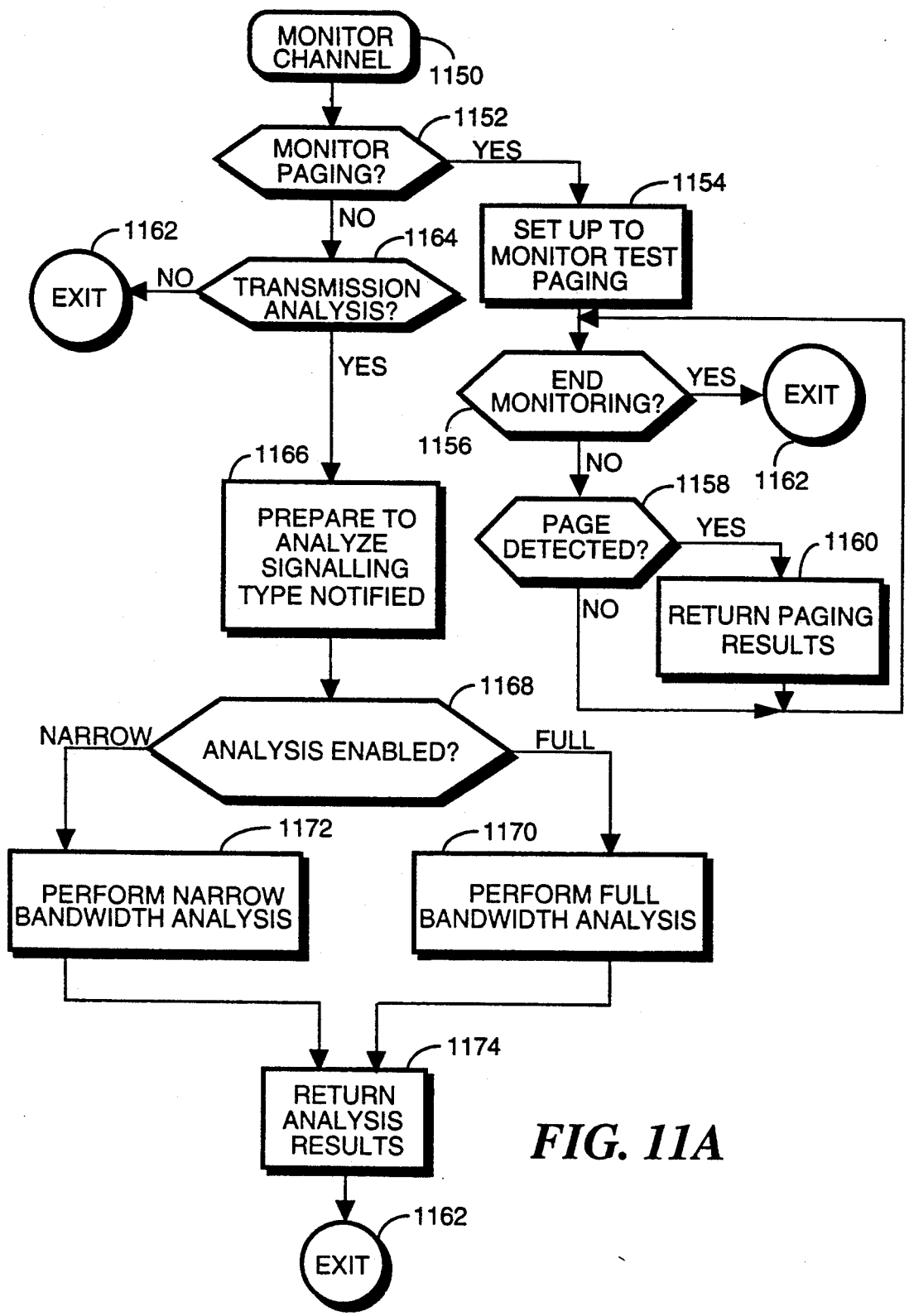
FIGS. 11A, 11B, and 11C comprise a flow diagram for the receiver of FIG. 6, operating in accordance with the preferred embodiment of the present invention of FIG. 10.
Figures 11B, 11C:
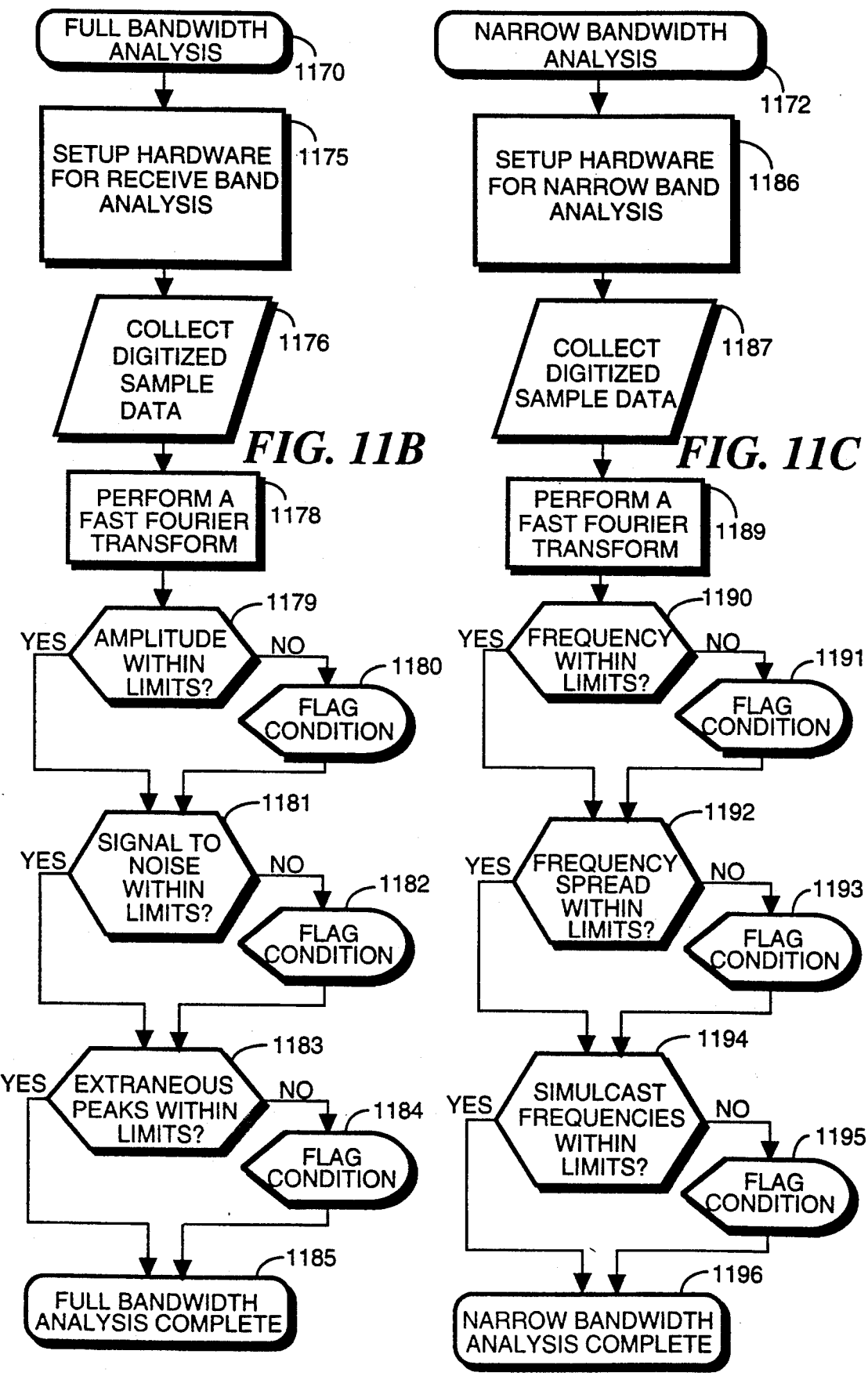

Referring to FIGS. 10A, 10B, 10C, and 10D, an exemplary flow diagram for the controller 106 of FIG. 2 is shown. Correspondingly, FIGS. 11A, 11B, and 11C comprise a flow diagram for the receiver 108 of FIG. 6, operating in accordance with the embodiment of the present invention of FIG. 10. Moreover, FIGS. 10A and 10B, illustrate an exemplary flow sequence for monitoring pages (system integrity testing), FIG. 10C illustrates an exemplary flow sequence for monitoring paging system transmit parameters, and FIG. 10D illustrates an action determination sequence at the controller 106. Lastly, FIG. 11A illustrates a "mainline" flow sequence, and FIGS. 11B and 11C illustrate the full and narrow bandwidth analysis flow sequences at the receiver 108.

As discussed earlier, the self-diagnostic paging system 100 is capable of automatically scheduling periodic diagnostic tests, such as system integrity tests (monitor pages) and transmit parameter tests (full/narrow bandwidth analysis). In the exemplary flow sequence of FIG. 10A, the controller 106 is scheduled to automatically perform a system integrity test 1002, and consequently begins initialization for system integrity testing by clearing all receive page type queues 1004 which are located in memory 211B. Further, the controller 106 instructs the receiver 108, via link 112 in a manner discussed earlier, to prepare and begin monitoring the paging channel, as illustrated in FIG. 11A 1150, 1152, and 1154. The receiver 108, normally would initialize portions of memory 611 at this time, and further would initialize the receiver circuits 602, as necessary to perform the monitoring function. For this example, the receiver 108 is instructed to monitor all digital pages following the GSC protocol, as discussed earlier, and to route the paging information, such as the addresses and optional messages, back to the controller 106 via modem communication on return link 112.

Subsequently, the controller 106 maintains the paging system on-line by continuing to receive pages from the paging terminal 102 and to route them to the corresponding transmitters 104, as discussed before. The controller 106 is then capable of selecting a page from the pages to be transmitted that matches the requirements of the predetermined integrity test, e.g., a GSC numeric message page, and storing a representation of the transmitted page in an appropriate receive queue in memory 211, as illustrated in FIG. 10A 1006 and 1008. At this point, timer or counter 228 is read to time stamp in memory 211 the page to be transmitted. Immediately, the page can be transmitted via the appropriate transmitters 104 along with any other transmitted information 1010. This transmit loop 1006, 1008, and 1010 can be repeated as often as the system has pages to include in the paging system integrity testing, a representation of each consecutive "test page" being stored in the appropriate receive queue.

Clearly, under normal on-line testing conditions, the paging system would normally transmit a plurality of "test pages" into the paging coverage area 101. This provides continuous monitoring of the paging system performance under charging paging traffic conditions. However, for simplicity of illustration herein, the exemplary test sequence shows only the one transmitted test page.

As mentioned before, the receiver 108 receives, decodes, and routes back to the controller 106, all paging information from the paging channel that matches the type of paging to be monitored 1158 and 1160, such as all digital paging following the GSC protocol. This monitor function continues until the receiver 108 is instructed by the controller 106 to end monitoring 1156 and 1162.

At the controller 106, any received page is compared with the oldest transmitted page 1012, 1014, and 1016, which for this example involves de-queueing the transmitted page for comparison. In an integrity testing sequence having multiple transmitted test pages to be compared, the de-queueing and comparison of transmitted to received pages 1014 and 1016 should be sequentially applied to all previously queued transmitted test pages as each received page is offered for comparison. This assures that any missed page or incorrectly received page will not corrupt the sequence and proper comparison of transmit to received pages, as represented in the queue structures in memories 211A and 211B.

Further, any page that is not detected and correctly matched to a previously transmitted page within a predetermined maximum time interval 1022 will be logged as a system failure 1019 and 1020. Similarly, any page that has a received address that matches a previously transmitted page address 1016, but the message is at least partially not received by the receiver 108 or incorrectly received 1017, will register a system failure 1019 and 1020. Otherwise, all correctly received test pages are logged 1016, 1017, and 1018, and the testing loop can continue.

Referring to FIG. 10B, in response to the controller 106 determining that a transmitted page was incorrectly received by the receiver 108, the controller 106 can perform a number of exemplary actions, as specified for a particular installation. For example, the controller 106 can re-queue and re-transmit the previously transmitted page 1026, 1028, and 1030, limited by a predetermined maximum number of re-tries. By re-transmitting a missed page, the self-diagnostic paging system 100 can significantly reduce the number of "missed pages" complaints from customers. Hence, since the paging system 100 is on-line and the "test pages" are actual pages being sent to customers, re-transmission of "missed pages" increases the reliability of the paging system 100 as perceived by customers.

Additionally, an emergency page can be sent to service personnel if the feature is enabled 1032 and 1034. By transmitting a representation of the diagnostic information to administrative/service personnel via a transmitted "emergency" page, the self-diagnostic paging system can essentially call for help upon a determination of system failure. Hence, service personnel are informed of the paging system diagnostic status, as necessary.

Furthermore, visual and audible alerts can be enabled based on predetermined configuration of the system installation 1036, 1038, 1040, and 1042. The visual alert can be a representation of the diagnostic information presented on an optional display console, 230, 234, or both, including a status of whether the transmitted page was correctly received by the receiver 108. Alternatively, other visual alert means can be employed, such as a lamp, a status indicator on the optional display console 230, 234, or both, or a hardcopy printout from a printer (not shown) coupled to the controller 106. For the audible alert, any conventional audible alerting device may be used, such as a speaker or transducer (not shown) coupled to the controller 106.

Lastly, the controller 106 in this example can activate an alarm condition by an alarm switch closure 1044 and 1046, such as may be necessary to communicate an alarm condition to another device or an alarm system. Also, predetermined user definable sequences of actions may be followed by the controller 1048 and 1050 in response to the system failure. Specific user definable sequences can be invoked based on different attributes of specific test results, such as particular pages being missed, or based on the type of pages being missed, or the number of pages being missed over a predetermined unit of time, or on any similar type of condition. The predetermined user definable sequences can include automatic adjustment of the transmitters 104, as discussed earlier. The controller 106, in response to a determination of system failure, can send instructions to the individual transmitters 104 (or a group thereof) servicing a paging coverage area to adjust their carrier frequency, their transmitted power, their relative propagation delays for synchronizing simulcast transmissions, and other transmitters parameters as predetermined in the user defined sequence. Furthermore, a combination of any of the aforementioned actions can be included in the particular sequence, as determined by the installation configuration and administrative/service personnel.

In this exemplary installation, the paging system 100 can automatically analyze transmit parameters in response to a system failure determination 1052, 1054, and 1056. Preferably, the analysis of transmit parameters is performed after all ongoing paging is completed and the portion of the paging system to be tested, including the transmitters 104, is taken off-line. However, if present conditions preclude taking the system off-line, such as the paging traffic being at peak period (e.g., paging queues in memory 211 are substantially full) and the system integrity test results indicate a non-critical failure condition (e.g., one missed page in a large group of correctly received pages) making it very disruptive to take the system off-line at the time, the system failure condition is flagged for subsequent parametric testing at the next opportune time 1058 and 1060, such as when the queues become substantially empty.

Referring to FIG. 10C, the controller 106 prepares for an analysis of transmit parameters 56 by signalling the paging terminal 102 to halt normal paging to the particular paging coverage area, in a known way. This handshaking is handled via the control link 204. The controller 106 then waits for the transmit queues in memory 211 to empty, i.e., all normal paging for the paging coverage area to be tested has stopped 62. Then, the controller 106 initializes the portions of memory 211, 211A, and 211B, as necessary for the testing, and further instructs the receiver 108 to initialize for parametric testing 64. Accordingly, the receiver 108 enters the parametric test mode and initializes to monitor the paging channel for the specified transmit parameter and signalling type notified, as illustrated in FIG. 11A 1150, 1152, 1164, and 1166, including initializing portions of memory 611 as necessary.

Depending on the type of analysis called for in the parametric test, the controller 106 may enable either the full bandwidth analysis 1168 and 1170 or the narrow bandwidth analysis 1168 and 1172 at the receiver. This further instructs the receiver 108 to enter the respective diagnostic routine, as shown in FIGS. 11B and 11C 1170 or 1172. Once the respective bandwidth analysis is complete, results are then returned from the receiver 1174 and 1162 to the controller 106.

Referring to FIGS. 11B and 11C, the full and narrow bandwidth analysis routines 1170 and 1172, as discussed earlier with reference to FIG. 9, monitor specific transmit parameters for the transmitter (or group of transmitters) 104 that are selected for the parametric test. The full bandwidth analysis, after setting up the hardware to receive information from the paging channel within the specified bandwidth limits 1175, collects digitized sample data 1176 and performs an analysis algorithm on the sampled data, such as the Fast Fourier Transform 1178, using known methods and techniques. The narrow bandwidth analysis similarly sets up the hardware for its respective specified bandwidth limits 1186, collects digitized sample data 1187, and performs an analysis algorithm such as the Fast Fourier Transform 1189 on the data.

The full bandwidth analysis routine can subsequently flag a monitored test condition, such as the amplitude of a received test signal is not within limits 1179 and 1180, the signal to noise levels of the received test signal is not within limits 1181 and 1182, and the amplitude of extraneous peaks relative to the test signal amplitude (i.e., interference signals) are not within specified limits 1183 and 1184. These results are collected and sent back 1185, 1174, and 1162 to the controller 106.

The narrow bandwidth analysis routine can similarly flag monitored test conditions, such as the frequency of a carrier test signal is not within limits 1190 and 1191, the frequency spread between respective signals and the main carrier signal are not within limits 1192 and 1193, and simulcast carrier frequencies from associated transmitters are not within limits 1194 and 1195. These results are likewise collected and sent back 1196, 1174, and 1162 to the controller 106.

Referring back to FIG. 10C, after initialization is complete as discussed earlier, the controller 106 then can perform parametric testing of individual transmitters 104 by sending a test signal and enabling the appropriate transmitter 104, as illustrated by loop 1066, 1068, 1070, 1072, and 1074. Each transmitter 104 can be tested for full bandwidth 1068, or narrow bandwidth 1070, or both, as necessary in a predetermined sequence. Further, in a simulcast transmitter system 1076, the controller 106 can test simultaneous groups of transmitters 104, as shown by loop 1078, 1080, 1082, 1084, and 1085. In all these cases, the results of each test and the determination for subsequent action by the controller 106 are logged so that an action service routine 1086 can subsequently dispose of any actions to be taken.

Referring to FIG. 10D, the action routine 1086, after self-initialization 1087, will sequence through the possible conditions configured for the installation and cause the appropriate or corrective actions to be performed. For each condition flagged 1088, any alerts enabled will be activated 1089 and 1090, and any corrective action enabled will be caused to be performed 1092 and 1094. Some examples of appropriate or corrective actions include adjusting the transmitter (or group of transmitters) 104 as discussed earlier, sending the appropriate information to administrative/service personnel to alert them of the results of the parametric testing, activating an alarm switch to indicate the failed test condition to another device or an alarm system, and other similar actions. The action determination routine will sequence through all possible conditions 1096, 1098, 1099, and 1088 configured for the installation, and then exit the routine 1097. In this way, the self-diagnostic paging system 100 is capable of automatically monitoring system integrity and transmit parameters, and subsequently causing appropriate or corrective action to be taken.

Thus, a more efficient and reliable paging system is provided that is capable of automatically performing self-diagnostic monitoring.

What is claimed is:

1. A paging system, comprising:
    transmitting means for transmitting first information comprising a transmitted page into a paging channel while maintaining the paging system on-line, the transmitted page being destined for a customer paging receiver;
    receiving means other than the customer paging receiver for receiving second information from the paging channel while the transmitting means is transmitting the first information into the paging channel, the second information corresponding to the first information comprising the transmitted page; and
    diagnostic means, coupled to the transmitting means and the receiving means, for monitoring the first and second information to determine whether the transmitted page was correctly received by the receiving means while maintaining the paging system on-line.

2. The paging system of claim 1, further comprising selective retransmitting means, coupled to the transmitting means and responsive to the diagnostic means, for selectively providing to the transmitting means for retransmission therefrom the transmitted page when the transmitted page was incorrectly received by the receiving means.

3. The paging system of claim 1, wherein the diagnostic means determines that the transmitted page was incorrectly received by the receiving means when the transmitted page was not received by the receiving means.

4. The paging system of claim 3, wherein the diagnostic means includes timing means for measuring a predetermined time interval and wherein the diagnostic means determines the transmitted page was not received when the transmitted page was not received by the receiving means within the predetermined time interval after being transmitted.

5. The paging system of claim 4, wherein the transmitted page includes a destination address, and wherein the diagnostic means determines that the transmitted page was not received when the destination address was not detected by the receiving means within the predetermined time interval after being transmitted.

6. The paging system of claim 1, wherein the diagnostic means determines that the transmitted page was incorrectly received by the receiving means when the transmitted page was erroneously received.

7. The paging system of claim 6, wherein the transmitted page includes a destination address and a message, and wherein the diagnostic means determines that the transmitted page was erroneously received when the destination address was received by the receiving means but the message was at least partially not received by the receiving means.

8. The paging system of claim 1, further comprising information means coupled to the diagnostic means for collecting diagnostic information comprising a status of whether the transmitted page was correctly received by the receiving means.

9. The paging system of claim 8, wherein the information means is coupled to the transmitting means for transmitting to administrative personnel a paging message comprising a representation of the diagnostic information.

10. A paging system, comprising:
   transmitting means for transmitting first information into a paging channel while maintaining the paging system on-line, the first information comprising a transmitted page;
   receiving means for receiving second information from the paging channel, the second information corresponding to the first information comprising the transmitted page; and
   diagnostic means, coupled to the transmitting means and the receiving means, for monitoring the first and second information to determine whether the transmitted page was correctly received by the receiving means while maintaining the paging system on-line, and
   wherein the diagnostic means includes parametric monitoring means coupled to the transmitting means for providing thereto a test signal for transmission therefrom in response to the diagnostic means determining that the transmitted page was incorrectly received by the receiving means, and
   wherein the parametric monitoring means is coupled to the receiving means for receiving a diagnostic signal therefrom in response to the transmitted test signal for monitoring transmit parameters of the paging system.

11. The paging system of claim 10, wherein the parametric monitoring means monitors at least one of a set of transmit parameters including transmit power, transmit carrier frequency, distortion of a transmitted test signal, or propagation delay of a delay measurement test signal.

12. A paging system diagnostic controller for use in a paging system having a paging transmitting means and a paging receiving means, comprising:
   transmitter monitor means coupled to the paging transmitting means for monitoring transmitted first information including a transmitted page being transmitted into a paging channel by the paging transmitting means while maintaining the paging system on-line, the transmitted page being destined for a customer paging receiver;
   receiver monitor means coupled to the paging receiving means other than the customer paging receiver for monitoring received second information being received by the paging receiving means from the paging channel while the paging transmitting means is transmitting the first information into the paging channel, the second information corresponding to the first information including the transmitted page; and
   verifying means coupled to the transmitter monitor means and the receiver monitor means for determining whether the transmitted page was correctly received within the second information received by the paging receiving means while maintaining the paging system on-line.

13. The paging system diagnostic controller of claim 12, further comprising selective re-transmitting means coupled to the paging transmitting means and the verifying means for selectively providing to the paging transmitting means for re-transmission therefrom the transmitted page when the transmitted page is determined to have been incorrectly received by the paging receiving means.

14. The paging system diagnostic controller of claim 12, wherein the verifying means determines that the transmitted page was incorrectly received when the transmitter monitor means detected the transmitted page having been transmitted by the paging transmitting means and the receiver monitor means did not detect the transmitted page having been received by the paging receiving means.

15. The paging system diagnostic controller of claim 14, further comprising timing means for measuring a predetermined time interval, the timing means being coupled to the verifying means for determining the transmitted page was incorrectly received when the transmitter monitor means detected the transmitted page having been transmitted and the receiver monitor means did not detect the transmitted page having been received within the predetermined time interval.

16. The paging system diagnostic controller of claim 14, wherein the transmitted page includes a destination address, and wherein the verifying means determines that the transmitted page was incorrectly received when the transmitter monitor means detected the destination address having been transmitted and the receiver monitor means did not detect the destination address having been received.

17. The paging system diagnostic controller of claim 12, wherein the verifying means determines that the transmitted page was incorrectly received when the transmitter monitor means detected the transmitted page having been transmitted and the receiver monitor means detected the transmitted page having been erroneously received.

18. The paging system diagnostic controller of claim 17, wherein the transmitted page includes a destination address and a message, and wherein the verifying means determines that the transmitted page was incorrectly received when the receiver monitor means detected the destination address having been received and the message having been erroneously received.

19. A paging system diagnostic controller for use in a paging system having a paging transmitting means and a paging receiving means, comprising:
   transmitter monitor means coupled to the paging transmitting means for monitoring transmitted first information including a transmitted page being transmitted by the paging transmitting means while maintaining the paging system on-line;
   receiver monitor means coupled to the paging receiving means for monitoring received second information being received by the paging receiving means, the second information corresponding to the first information comprising the transmitted page;
   verifying means coupled to the transmitter monitor means and the receiver monitor means for determining whether the transmitted page was correctly received within the second information received by the paging receiving means while maintaining the paging system on-line; and
   parametric monitoring means coupled to the verifying means, and coupled to the paging transmitting means for providing thereto a test signal for transmission, and coupled to the paging receiving means for receiving a diagnostic signal therefrom in response to the transmitted test signal for monitoring transmit parameters of the paging system in response to the verifying means determining that the transmitted page was incorrectly received.

20. A self-diagnostic paging system, comprising:
   transmitting means for transmitting a test signal into a paging coverage area of the self-diagnostic paging system;
   receiving means for receiving a diagnostic signal from the paging coverage area while the transmitting means is transmitting the test signal into the paging coverage area, the diagnostic signal corresponding to the test signal; and
   monitor means coupled to the transmitting means for providing the test signal thereto and coupled to the receiving means for monitoring the transmit parameters of the self-diagnostic paging system as determined from the diagnostic signal received by the receiving means.

21. The self-diagnostic paging system of claim 20, wherein the monitor means monitors at least one of a set of transmit parameters including transmit power, transmit carrier frequency, distortion of a transmitted test signal, or propagation delay of a delay measurement test signal.

22. The self-diagnostic paging system of claim 20, further comprising information means coupled to the monitor means for collecting diagnostic information comprising a representation of the monitored transmit parameters of the paging system.

23. The self-diagnostic paging system of claim 22, wherein the information means comprises a display for displaying the diagnostic information comprising a representation of the monitored transmit parameters of the paging system.

24. A method for diagnosing page reception failures in a paging system, the paging system comprising transmitting means for transmitting first information comprising a transmitted page and receiving means for receiving second information, the method comprising the steps of:
   transmitting first information comprising a transmitted page into a paging channel while maintaining the paging system on-line, the transmitted page being destined for a customer paging receiver;
   monitoring the first information at the transmitting means;
   receiving second information at the receiving means from the paging channel while transmitting the first information into the paging channel, the receiving means being other than the customer paging receiver, the second information corresponding to the first information comprising the transmitted page; and
   determining a page transmission failure has occurred when the transmitted page was monitored having been transmitted with the first information by the transmitting means and not having been received with the second information by the receiving means while maintaining the paging system on-line.

25. The method of claim 24 wherein the paging system comprises first and second memory means, and wherein the determining step comprises the steps of:
   storing a representation of the transmitted first information comprising the transmitted page as monitored at the transmitting means into the first memory means;
   storing a representation of the received second information into the second memory means;
   verifying if representation of the transmitted page stored in the first memory means is found with the representation of the received second information stored in the second memory means; and
   determining a page reception failure has occurred when the representation of the transmitted page stored in the first memory means is not found stored in the second memory means.

26. The method of claim 24 wherein the paging system comprises first and second memory means, wherein the transmitted page includes a destination address and a message, and wherein the determining step comprises the steps of:
   storing a representation of the transmitted first information comprising the destination address and the message as monitored at the transmitting means into the first memory means;
   storing a representation of the received second information into the second memory means;
   verifying if representation of the transmitted destination address and message stored in the first memory means is found with the representation of the received second information stored in the second memory means; and
   determining a page reception failure has occurred when the representation of the transmitted destination address is found stored in the second memory means and representation of the message is at least partially not found stored in the second memory means.

27. A self-diagnostic paging system, comprising:
   paging transmitting means for transmitting first information comprising transmitted pages into a paging channel, the transmitted pages being destined for customers of the self-diagnostic paging system while maintaining the self-diagnostic paging system on-line;
   a plurality of paging receivers for receiving second information from the paging channel while the paging transmitting means is transmitting the first information into the paging channel, the second information corresponding to the first information comprising the transmitted pages;
   determining means, coupled to the paging transmitting means and one of the plurality of paging receivers, for on-line monitoring the first and second information to automatically determine whether the transmitted pages were correctly received by the one of the plurality of paging receivers while maintaining the self-diagnostic paging system on-line.

* * * * *